(12) United States Patent
Dvorak

(10) Patent No.: US 6,473,734 B1
(45) Date of Patent: Oct. 29, 2002

(54) METHODOLOGY FOR THE USE OF VERBAL PROXIES FOR DYNAMIC VOCABULARY ADDITIONS IN SPEECH INTERFACES

(75) Inventor: Joseph L. Dvorak, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/534,589

(22) Filed: Mar. 27, 2000

(51) Int. Cl.[7] .............................................. G10L 15/00
(52) U.S. Cl. ....................... 704/235; 704/270
(58) Field of Search ................................ 704/243, 235, 704/244, 245, 251, 255, 270, 275

(56) References Cited

U.S. PATENT DOCUMENTS 5,724,481 A * 3/1998 Garberg et al. .............. 704/243
5,797,116 A * 8/1998 Yamada et al. ................ 704/10
5,867,495 A * 2/1999 Elliott et al. ................. 370/352

OTHER PUBLICATIONS

Young, Steve, "A Review of Large–Vocabulary Continuous–Speech Recognition," IEEE Signal Processing Magazine, Sep. f1996.
"Language Presents Devilishly Tough Challenges for Computers," Wildfire Communications, Inc., Lexington, MA 02421, Sep. 7, 1999.

* cited by examiner

Primary Examiner—Susan McFadden
(74) Attorney, Agent, or Firm—Miller, Johnson, Snell & Cummiskey, P.L.C.

(57) ABSTRACT

An application (50) utilizing a speech recognition interface (10) employs the use of verbal proxies to accomplish dynamic vocabulary updates. One or more proxies used by the application (50) are defined (60) and added to the vocabulary (38) of the speech recognition interface (10). Upon the speech recognition interface (10) receiving a speech signal (14) representative of a command containing a defined proxy, the recognized speech is converted to text by the speech recognition interface (66, 68) to generate a text version of the recognized speech (28). The application receives the text version of the recognized speech (28) and processes it in accordance with the received command (70, 72). A parsing function (52) of the application (50) receives the text version of the recognized speech and determines what proxy routine(s) of the application to send the speech information to (80, 82). The identified proxy function (54) of the application receives the text version of the recognized speech, together with externally provided target information, and links a textual target contained in the target information to the defined proxy (84, 86). The proxy function (54) further generates an update instruction (56) that causes the speech recognition interface to insert the selected text-based target (58), provided by the proxy function, into the grammar (40) of the speech recognition interface, thereby updating the vocabulary (38) and the grammar (40) of the speech recognition interface.

16 Claims, 3 Drawing Sheets

METHODOLOGY FOR THE USE OF VERBAL PROXIES FOR DYNAMIC VOCABULARY ADDITIONS IN SPEECH INTERFACES

FIELD OF THE INVENTION

The present invention relates generally to automatic speech recognition, and more particularly, to a method for improved vocabulary additions of speech interfaces.

BACKGROUND OF THE INVENTION

The object of automatic speech recognition (ASR) systems is to capture an acoustic signal representative of speech and determine the words that were spoken. Speech recognizers typically have a set of stored acoustic and language models represented as patterns in a computer database which are the result of stored rules of interpreting the language. These stored models are then compared to the captured signals. The contents of the computer database and the techniques used to determine the best match are distinguishing features of the various types of ASR systems available for use.

An ASR system, however, is only as effective as its ability to recognize words spoken by a user of the system. In small vocabulary applications of typically less than 50 words in which the number of words to be spoken can be readily ascertainable and therefore rigidly defined, a model can be generated and stored for each of the words in the recognition vocabulary. For large-vocabulary applications, such as applications of greater than 1000 words, however, models and recognition algorithms require impracticably large computations. Large-vocabulary applications, therefore, will typically have models for a smaller number of sub-word speech segments, referred to as phonemes, that can be concatenated to produce a model of one or more words. Even so, in most large-vocabulary applications it is not feasible to store models for every conceivable word that a user might use. This is especially true where the words that might be uttered by a user can be expected to be specific to that user, such as names or places that are of particular interest to only that user.

In applications subject to some degree of personalization by the user, such as large-vocabulary applications, in which it is anticipated and even expected that the user will at some point utter a word that is not recognized by the ASR system, there needs to be a mechanism in place for the user to dynamically add at-will the desired, unknown word to the vocabulary of the ASR system. Often, the user can enter the word to be added through some type of user interface, other than voice recognition, such as via a touch screen or a keypad of a device of the application. This approach may not be acceptable, however, in applications in which the only user interface to the application is via the ASR system. Such is the case in applications, such as radio wireless devices and other communication devices, that have undergone miniaturization to the point where communication with the user through traditional, non-speech recognition-based means like keyboards, keypads, etc. is no longer feasible nor desirable. For these applications the user uses speech to add the new word to the ASR vocabulary, except in the unlikely event that the user has access to a computer with a grammar utility. The typical approach for a user to add a new word or words to an ASR-based application using speech is for the user to spell the new word by saying individual letters. This approach, however, is tedious, time-consuming, and prone to error.

The difficulty of this approach for adding a word that is not part of the grammar of the ASR system of the application being used is illustrated by the following example. Suppose that a user of a radio wireless communication device having ASR capabilities receives a call from a person named Camille; Camille, perhaps the name of a friend of the user, is a word not recognized by the ASR system of the radio wireless communication device. After terminating the call, the user wishes to add Camille and her phone number to the phone book function of the wireless communication device by saying something like, "Add Camille to my phone book." This is not possible, however, since the word "Camille" is not yet part of the speech recognizer's vocabulary and thus the communication device will not recognize the word "Camille." The recognizer will most likely erroneously choose a name already in the vocabulary that sounds similar to Camille or reject the word as being unrecognized. And while the user may enter the word "Camille" to the recognizer's vocabulary by spelling the word, this is a time-consuming, error-prone, and tedious task that is not particularly user-friendly.

U.S. Pat. No. 5,724,481 to Garberg et al. describes a method for automatic speech recognition of arbitrarily spoken words in which the user must enter a piece of information related to the information to be added to the recognizer's vocabulary. If the user wanted to enter the name "Camille," for instance, and the user knew that the application maintained a relationship between Camille's name and her phone number, then the user could say "Add 555 1212 to my phone book." This would cause the application to add the name "Camille" to the phone book, assuming that 555 1212 is the phone number of Camille. A drawback of this approach, however, is that it requires user interaction and knowledge. The user could not have caused the name "Camille" to be added to the vocabulary if he had not known her phone number. Additionally, the related information required, in this case, the phone number, is different for each word or phrase to be added and so this approach is difficult to remember and use. Moreover, this approach requires that the related information for each word that could possibly be added must already be in the recognizer's vocabulary. This requirement, of course, significantly increases the vocabulary size.

U.S. Pat. No. 5,797,116 to Yamada et al. describes a method for adding unknown words by performing natural language processing on an input sentence to determine the part of speech of the word to be added. This information is used to create a query to the user for information that more narrowly defines the scope of the unknown word. The user's response to the query is contained within a supplementary database that has a high probability of containing the word to be added. Next, acoustical matching is performed to determine the entry in the supplemental database that is closest to the unknown word and this entry is used for the unknown word. The approach of the Yamada et al. patent has several shortcomings. First, natural language processing is required and this increases the overhead associated with the speech recognition process. Second, a supplemental database containing the user's answers to queries must be maintained. Third, the method requires human intervention by the user in order to add a word.

In light of the foregoing, there is therefore an unmet need in the art for a user of an application that utilizes a speech recognition interface to be able to add new words to a vocabulary of the interface in a manner that overcomes these various shortcomings, is user-friendly, and one that minimizes error and is not time-consuming.

BRIEF DESCRIPTION OF THE DRAWINGS

The novel features believed characteristic of the invention are set forth in the claims. The invention itself, however, as well as the preferred mode of use, and objects and advantages thereof, will best be understood by reference to the following detailed description of an illustrative embodiment when read in conjunction with the accompanying drawing (s), wherein:

DETAILED DESCRIPTION OF THE INVENTION

The present invention is applicable to any application that utilizes a speech recognition interface provided by an automatic speech recognition (ASR) system, also called a speech recognizer, in which it is necessary to dynamically update the speech recognizer's vocabulary from time to time. The present invention is particularly applicable to wireless devices and services that can be expected to have a high degree of dependency upon speech recognition technology. ASR systems are expected to become very important in future wireless devices. As wireless devices become smaller and smaller in size, user interface means such as keyboard and screen will become either increasingly difficult for the user to use or inconsistent with the miniaturization process. The increased ease of use via hands free operation will become increasingly important and thus the speech interface afforded by a speech recognizer will become increasingly important as well. Since the speech interface is expected to become the primary user interface of such wireless devices, the ability to dynamically add new words or phrases to the vocabulary of the wireless device without the use of keypads or touch screens is of paramount importance.

Figure 1:
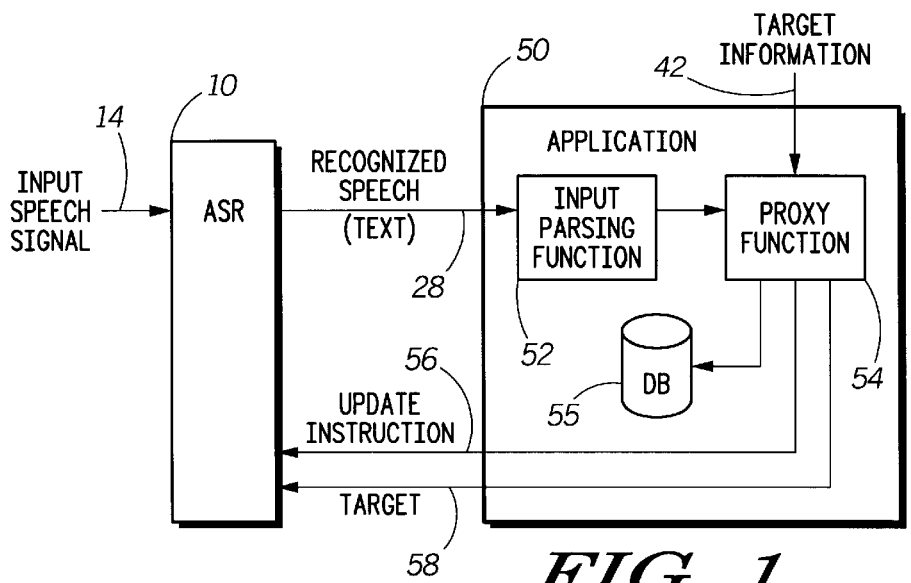
FIG. 1 is an overall system block diagram, in accordance with the present invention.

FIG. 1 is an overall system block diagram, in accordance with the present invention. Input speech signal 14 is provided to the ASR system or interface 10 from an audio source, such as a microphone that receives speech spoken by a user of the system. ASR system 10 operates to recognize the incoming speech signal 14 and to generate a text signal of recognized speech 28 that is provided to input parsing function 52 of application 50. If recognized textual speech 28 contains proxy information, proxy function 54 in conjunction with address database 55 of application 50 will perform functions in accordance with the received proxy information as described below. Application 50 will generate an update instruction 56 that will cause ASR system 10 to add a target word of the proxy (shown as target 58 and contained within the target information 42 provided to proxy function 54) to the vocabulary and then recompile the vocabulary. The functioning of input parsing function 52 and proxy function 54 of application 50 will be explained in more detail below.

Application 50 may be any application in which it is desirable to dynamically add words to the speech recognizer's vocabulary without requiring direct user intervention to do so. Application 50 thus can include wireless radio communication device functions, e-mail applications, calendar applications, etc. It is understood that proxy function 54, while shown as resident within application 50 need not reside within application 50 for a proper functioning of the present invention.

Figure 2:
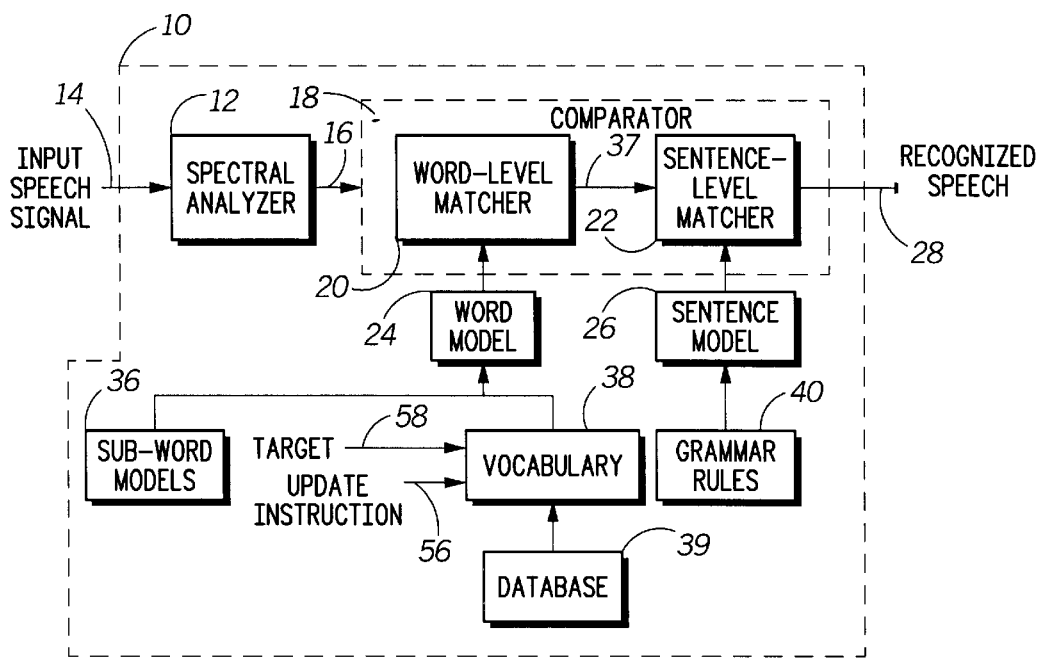
FIG. 2 is a block diagram of a continuous speech recognizer, in accordance with the present invention.

Referring now to FIG. 2, ASR system, or speech recognizer, 10 includes a spectral analyzer 12 for receiving an input speech signal 14 and for providing a feature vector sequence 16 representative of the input speech. A comparator 18 performs word-level matching 20 and sentence-level matching 22 based on stored word models 24 and sentence (language) models 26, respectively, to provide a textual output 28 representative of recognized speech. Each step of the speech recognition process performed by ASR system 10 is based on probabilities and thus the output signal generated by sentence-level matcher 22 is representative of the word and sub-word grouping having the highest probability as defined by the language model specified by the grammar rules 40.

Spectral analyzer 12 samples analog input speech signals, such as the voltage output signal of a microphone that receives words spoken by a user of the application, at a sampling rate appropriate to the particular application. For instance, a broad-band application making use of a microphone to receive the spoken words might have a sampling rate of 16 kHz while a narrow-band application making use of telephone lines would typically have a slower sampling rate of perhaps 8 kHz. The sampling rate selected is typically slightly more than twice the frequency of the speech signal 14 received by the recognizer.

Figure 3:
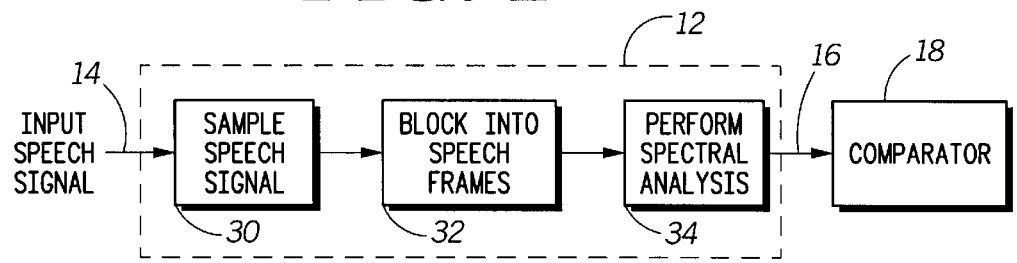
FIG. 3 is a flow diagram of the steps performed by the spectral analyzer of FIG. 2, in accordance with the present invention.

As shown in FIG. 3, after sampling 30 the incoming speech signal 14, spectral analyzer 12 blocks the sampled speech into speech frames 32 by placing a "window" over the samples that preserves the samples in the time interval of interest, while eliminating all other samples. The analyzer 12 then performs spectral analysis 34 by computing a short term Fourier transform on the window of samples to provide a feature vector sequence 16, having a set of parameter coefficients characteristic of each speech frame. The window is placed over overlapping intervals of the sampled speech signal at a predetermined "windowing rate" to obtain a sequence of spectra representative of the spectral characteristics of input speech signal 14 over time.

Feature vectors 16 are received by word-level matcher 20 of comparator 18. Word-level matcher 20 uses a set of representations of sub-word, or phoneme, models 36 and a vocabulary 38, which accesses database 39, to create a set of probabilities 37 corresponding to the probability that there is a match between the incoming feature vector sequence 16 and the words stored as text in vocabulary 38. Database 39 may be a phonetic dictionary such as CMU PHONE from Carnegie Mellon University or TIMIT from Oregon Graduate Institute. There are many approaches in the art for determining probabilities 37. The text words contained within vocabulary 38 and the grammar rules 40 must be compiled by the ASR system 10 before they can be used.

The grammar rules 40 and the vocabulary 38 together define acceptable utterances that will be recognized by ASR system 10. Suppose, for instance, that the set of defined person names contained within vocabulary 38 are Joe, Barb, and Tom, but the user wishes to add the caller Camille. In accordance with the present invention, new words can be added to the vocabulary 38 through the use of one or more verbal proxies. The vocabulary of the present invention, in addition to the names Joe, Barb, and Tom contained within the vocabulary 38, will therefore also contain one or more proxies that enable the user of the ASR system to dynamically add unknown words to the vocabulary. Returning to the example above, suppose that the vocabulary contains, in addition to persons names Joe, Barb, and Tom, a verbal proxy, called "sender," so that the set of acceptable utterances for people has expanded to become:

<person>: Joe/Barb/Tom/Sender;

Upon the user speaking the verbal proxy, "sender" in this case, the information associated with "sender" will be added to the vocabulary of the system in a manner discussed below. After the information associated with sender has been added, the vocabulary 38 will have to be recompiled so that the newly added word will be subsequently recognized when it is next spoken by the user.

Figure 4:
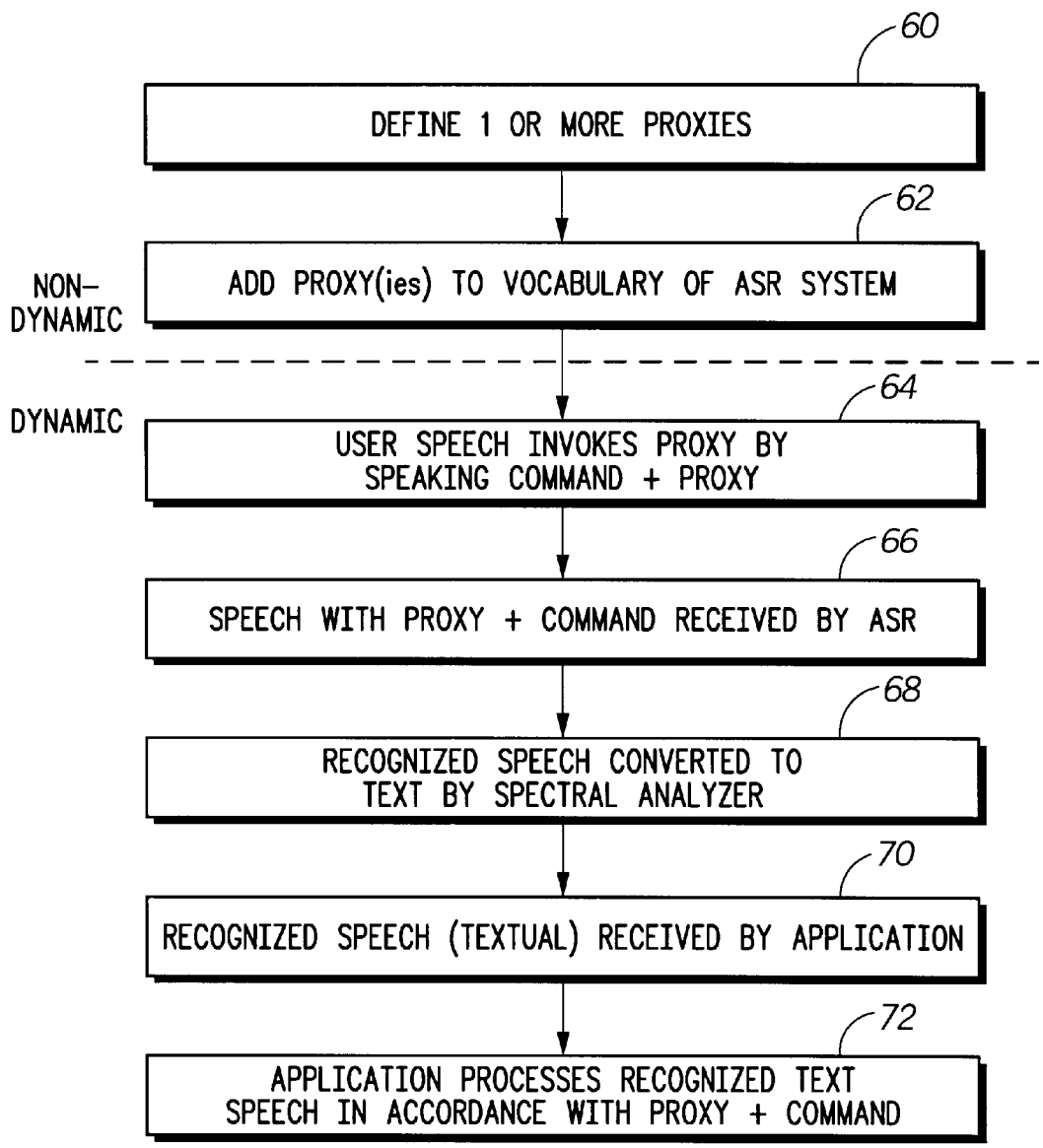
FIG. 4 is an overall flow diagram of the methodology used in accordance with the present invention.

Referring now to FIG. 4, an overall flow diagram of operation of the present invention is illustrated. At Block 60, one or more proxies are defined. A proxy is a predetermined textual word that is representative of a dynamic target which is a word (such as a name) that is identifiable in a predetermined manner but that can be expected to change over time; the defined proxy is textual so that it can be easily added to the vocabulary 38. For example, the user of a wireless radio communication device may wish to dynamically add the names of some callers (senders) when they call. A complete set of all callers that might call, and their caller information, cannot be feasibly contained within the vocabulary of the ASR system. By defining "sender" or "caller" as a proxy that represents a name received in a predetermined caller ID format that can be added to the vocabulary 38, however, the present invention will provide a user of an ASR-based application with the ability to dynamically add any such sender or caller. The proxy names are application-specific and thus are chosen in accordance with the type of application with which the invention will be used. Thus, for a wireless radio communication device application, the words "sender" and "recipient" may be defined as proxies. After the appropriate proxy or proxies are defined, they are added to the text vocabulary 38 of the ASR system at Block 62. Blocks 60 and 62 are steps that are performed prior to a user using the application 50 and thus may be considered to be the non-dynamic portion of the methodology of FIG. 4. The available proxies for a particular application are defined up-front and integrated into the vocabulary 38 of the ASR system 10 prior to a user using the application 50.

Blocks 64–72 represent the steps of the methodology that are taken in order to dynamically add a target word, hereafter called just a target, to the vocabulary 38 that the user has indicated should be added by the user's selection of a proxy. At Block 64, the user speaks a command, typically "Add," followed by the defined proxy, such as "Sender," in order to invoke the proxy function 54 of application 50; thus, if the defined proxy is "sender," the user may say "Add Sender to Address Book" to invoke the proxy function of application 50 that adds to the vocabulary 38 of ASR system 10 a target that is the present value of the dynamic target represented by the proxy "Sender". In this case, "Add X to Address Book" is the command to be performed by application 50 and X ("sender") is the proxy that refers to the target to be added to the vocabulary. Input speech signal 14 containing the command and proxy is received by ASR system 10 at Block 66. As described above, at Block 68 the incoming speech signal 14 is processed by ASR system 10 to generate recognized speech signal 28. So long as the user speaks a valid proxy defined at Block 62 and a command known by the application 50, the speech will be recognized by ASR system 10.

Figure 5:
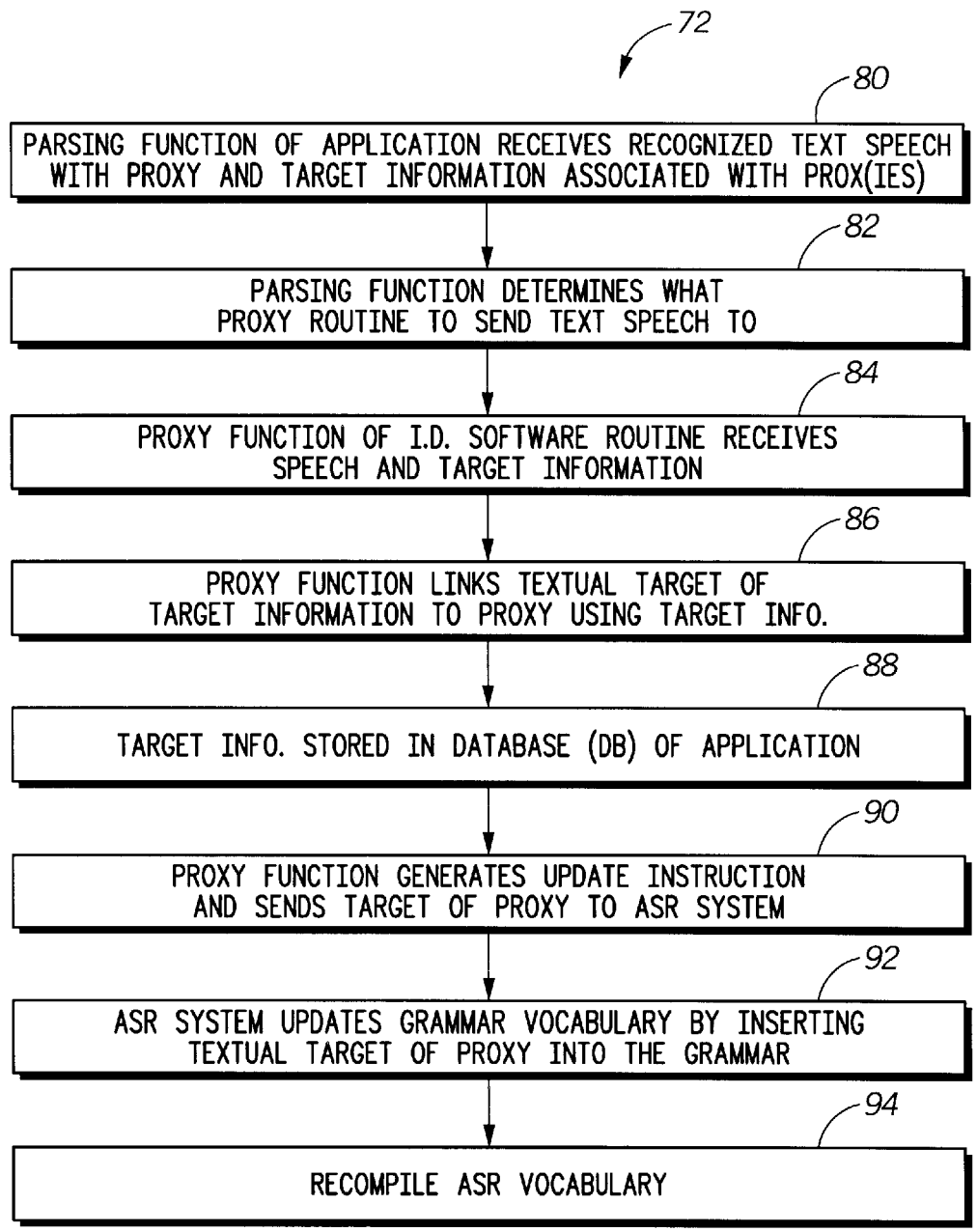
FIG. 5 is a flow diagram illustrative of processing a command and proxy in order to add a target of the proxy to a vocabulary, in accordance with the present invention.

At Blocks 70 and 72, the text version of the recognized speech, or recognized text-based speech, containing the command and proxy 28 is received by application 50 and processed in accordance with the proxy function of FIG. 1. FIG. 5 conveys the specific processing steps contained within Block 72. The recognized text-based speech 28 is received by the input parsing function 52 of application 50 as shown at Block 80. Input parsing function 52, which could also be referred to as a call or dispatch command function, determines what software routine(s) within application 50 that should receive incoming recognized speech 28 (Block 82). The parsing function looks to the command and proxy information contained within speech 28 to ascertain the appropriate routine to call. Dispatch methods well known in the art, such as tables or IF-THEN statements, may be used to determine which software routines should be called in response to a particular command-proxy combination spoken by the user. Once the appropriate software routine or routines have been identified incoming speech 28 is routed to the identified software.

A proxy function 54 of the identified software routine receives the incoming speech 28 and target information 42 provided to application 50, as shown at Block 84. Target information 42 contains the target and other information about the target of the proxy, and might be provided from a number of sources external *to the application, such as from "Caller-ID." In a wireless communication application in which the proxy is "Sender," for instance, the target information will contain the name of the sender (caller), such as "Camille," and might also contain other related information such as the length of the call in minutes, the address of the sender, and the phone number of the sender. At Block 86, proxy function 54 links the proxy contained within incoming speech 28 to the target identified in target information 42. Linking is the process by which the target, or the present value of the dynamic target represented by the proxy, is identified and associated with the proxy, using the particular proxy contained in the incoming speech 28. In this example, proxy function 54 will link the "Sender" proxy with the name "Camille." Proxy function 54 may cause the target information 42 associated with the sender Camille to be stored in an address database 55 of the application for future reference, as shown at Block 88. Once the appropriate linkage between proxy and dynamic target has occurred, then at Blocks 90 and 92 proxy function 54 generates an update instruction 56 that, when received by ASR system 10, will cause a vocabulary update function of ASR system 10 to update grammar 40 and vocabulary 38 to include target 58 ("Camille") by inserting the textual target of the proxy into the grammar. The vocabulary update function of ASR system 10 updates vocabulary 38 by inserting text-based target 58 into vocabulary 38. Of course, it should be noted that the vocabulary update function checks for duplicate words and thus will not add a target word that is already part of vocabulary 38. To continue with the example cited previously in which the vocabulary set of persons initially contained predefined names and the proxy "Sender," <Person>: Joe/Barb/Tom/Sender;, the set of persons after the update will be: <Person>: Joe/Barb/Tom/Sender/Camille;. Finally, at Block 94, the newly updated ASR vocabulary 38 is recompiled in order to make the dynamically added target word "Camille" available to the user. Now, when the user wishes to speak "Camille" this name will be recognized by the ASR system 10.

The present invention requires that the target information 42 provided to application 50 contain the name of the dynamic target of the proxy spoken by the user. Target information 42 is typically provided to an application during a transaction involving the target word of interest. Target information may be provided to application 50 by many sources and is therefore largely determined by the type of application. In a radio wireless communication device, such as a cellular telephone, for instance, target information 42 might be provided by a caller-identification "Caller-ID" function commonly associated with telephone services that provides information about the name of the caller (sender), the length of the call, the number called from, the address of the caller, etc. Once the name of a specific caller has been added to the vocabulary and related information about that specific caller has been added to the application database, the user is free to use applicable commands using that newly added name, such as "Call Camille," that require access to the related information about Camille, i.e. the phone number of Camille.

Or, if the application is a web browser tool used for navigating or "browsing" on the Internet, proxies might be defined for dynamic targets representative of names of web sites to be added to a "location book." In this instance, a proxy called "location" might be added to the vocabulary so that a user, upon navigating to a new, previously unknown, location on the Internet may add that location, X, to the location book by simply speaking the command, "Add location to location book." Then when the user wishes to subsequently navigate to that target location, he may directly speak the command, "Navigate to X."

If the application is an electronic mail (e-mail) program that operates on the Internet or otherwise, the target information provided to the e-mail program might likewise contain information about the sender of an e-mail message, the email address of the sender, the subject of the e-mail message, the recipient of the e-mail message, and names and related information about the persons copied on the e-mail message. If multiple proxies have been defined in the vocabulary of the ASR system, such as "copied 1," copied 2," etc., for instance, then after the user speaks commands "add copied 1" and "add copied 2" the target names associated with proxies "copied 1" and "copied 2" will be added to the vocabulary of the ASR. Thus, if the targets of copied 1 and copied 2 on an e-mail, for example, are "Mike" and "Todd," respectively, the user can thereafter simply state the desired command and name without ever having to manually enter the new words Mike and Todd.

Other applicable applications include, but are not limited to, electronic calendar and organizer applications in which meeting and task information might be provided as related information of a target word to be added.

The timing involved with invoking the proxy function is flexible and again largely a function of the type of application for which the present invention is used. In a cellular telephone or other telephone application, for example, the application may require that a user can only invoke the proxy function after receiving a phone call and prior to placing a subsequent phone call since the caller-id information will only be available during that time. Conversely, a user of an e-mail application may be able to add a new word associated with a received e-mail message for an indefinite amount of time by simply selecting the received e-mail to provide the application with access to the proxy target and related information.

It can be seen that the above methodology and structure of the present invention allows a user of a speech recognition-based application to easily and dynamically add an unknown word to a vocabulary of an ASR system used by the application with no direct user intervention required. Once acceptable text-based proxies have been defined and added to the vocabulary of the ASR system, the user only has to speak an add command containing a defined proxy in order to have the target of that proxy automatically added to the ASR vocabulary.

The methodology and structure of the present invention in this way provides advantages for dynamically adding new, unrecognized words to a vocabulary of ASR-based application system. Some of the representative advantages will now be described. First, minimal user interaction is required to dynamically add new words, thereby minimizing both the time and error rate associated with adding words to ASR vocabularies. The user simply has to speak the add command with the appropriate proxy for the target word associated with that proxy to be automatically added. Second, the overhead associated with adding textual information to a vocabulary and then recompiling the vocabulary to make the addition permanent may be expected to be minor and is a function of the computing resources available. Third, information related to target words is also automatically stored in a database of the application for future reference at the time the target word is added by the user and thus need not be entered or remembered by the user of the application. As previously recited, such related information depends upon the application itself and can include such information as phone number, address, origin information, carbon copy recipients, location, tasks, meetings, etc. Thus, no supplemental database for related information is required. Fourth, the verbal proxy is constant and thus easy to remember. Additionally, the use of a constant proxy has a minimal impact upon the size of the speech recognizer's vocabulary, resulting in minimal loss of recognition accuracy. Fifth, with the present invention, no query is directed to the user, resulting in zero user intervention required to add a new word to the vocabulary. Sixth, no matching algorithm is performed, acoustic or otherwise, to determine which of a number of possibilities is the closest choice, as in the prior art. Rather, the linkage between the proxy and the target word ensures accuracy.

While the invention has been particularly shown and described with reference to one or more preferred embodiments, it will be clearly understood by those of ordinary skill in the art that the invention is not so limited. Numerous modifications, changes, variations, substitutions and equivalents may be made therein without departing from the spirit and scope of the invention. For instance, the embodiment of the present invention, illustrated in FIGS. 1–5, is preferably processing system based, wherein the principles of the invention are implemented in software. The software is preferably compiled and stored to a suitable conventional storage medium, either internal or external to the processing system. Alternate preferred embodiments may also be implemented in hardware or firmware as well. Additionally, the embodiment of the present invention makes reference to "a user" of the application speaking a command and a proxy. It is understood that the user may be a person or could be machinery or another application capable of speaking words.

What is claimed is:

1. A method for dynamic vocabulary addition to a speech recognition interface of an application using verbal proxies, comprising:

defining one or more proxies;

adding the one or more proxies to a vocabulary of the speech recognition interface;

receiving an input speech signal representative of a command and a proxy of the one or more proxies;

providing the input speech signal to the speech recognition interface of the application;

the speech recognition interface processing the input speech signal to generate a text version of a recognized speech containing the command and proxy;

the application receiving and processing the text version of the recognized speech to generate an update instruction; and controlling the speech recognition interface in accordance with the update instruction to update the vocabulary of the speech recognition interface to include a target of the proxy and thereafter linking the proxy to the target.

2. The method according to claim 1, wherein the input speech signal representative of the command and the proxy is generated by a user of the application speaking the command and the proxy.

3. The method according to claim 1, wherein each proxy of the one or more proxies is representative of a dynamic target.

4. A computer program recorded in machine readable memory for performing dynamic vocabulary addition to a speech recognition interface of an application using verbal proxies, said program comprising:

instructions for adding one or more proxies that have been defined to a vocabulary of the speech recognition interface;

instructions of the speech recognition interface for receiving and processing an input speech signal representative of a command and a proxy to generate a text version of a recognized speech;

instructions of the application for receiving and processing the text version of the recognized speech to generate an update instruction;

instructions of the speech recognition interface for controlling the speech recognition interface in accordance with the update instruction to update a vocabulary of the speech recognition interface to include a target of the proxy; and wherein the input speech signal representative of the command and the proxy is generated by a user speaking the command and the proxy of the application.

5. The computer program according to claim 4, further comprising instructions to identify the target as a present value of a dynamic target represented by the proxy.

6. A method for dynamic vocabulary addition to a speech recognition interface of an application using verbal proxies, comprising:

defining one or more proxies;

adding the one or more proxies to a vocabulary of the speech recognition interface;

receiving an input speech signal representative of a command and a proxy;

providing the input speech signal to the speech recognition interface of the application;

the speech recognition interface processing the input speech signal to generate a text version of a recognized speech that contains the command and the proxy;

a parsing function of the application receiving the text version of the recognized speech and identifying a software routine of the application to receive the command and the proxy;

a proxy function of the identified software routine receiving the command and the proxy, wherein target information is received by the proxy function from a source external to the application and the target information includes a text-based target of the proxy;

the proxy function linking the text-based target contained within the target information to the proxy;

the proxy function generating an update instruction;

the speech recognition interface receiving the update instruction and the text-based target from the proxy function of the application; and the speech recognition interface updating the vocabulary in accordance with the update instruction to include the text-based target.

7. The method according to claim 6, wherein each proxy of the one or more proxies is representative of a dynamic target.

8. The method according to claim 6, wherein the input speech signal representative of the command and the proxy is generated by a user of the application speaking the command and the proxy.

9. The method according to claim 6, wherein the target information additionally includes a related information of the target.

10. The method according to claim 6, additionally comprising:

saving the related information to a database of the application.

11. The method according to claim 6, wherein updating the vocabulary comprises inserting the text-based target into the vocabulary.

12. A computer program recorded in machine readable memory for performing dynamic vocabulary addition to a speech recognition interface of an application using verbal proxies, said program comprising:

instructions for adding one or more proxies that have been defined to a vocabulary of the speech recognition interface;

instructions of the speech recognition interface for receiving and processing an input speech signal representative of a command and a proxy to generate a text version of a recognized speech;

instructions of the application for receiving the text version of the recognized speech and identifying a software routine of the application to receive the text version of the recognized speech;

instructions of a proxy function of the identified software routine for receiving the text version of the recognized speech and a target information, wherein the target information is received by the proxy function from a source external to the application and includes a text-based target of the proxy to be added to a vocabulary of the speech recognition interface;

instructions of the proxy function for linking the text-based target contained within the target information to the proxy;

instructions of the proxy function for generating an update instruction; and instructions of the speech recognition interface for receiving the update instruction and the text-based target from the proxy function and for updating the vocabulary in accordance with the update instruction to include the text-based target.

13. The computer program according to claim 12, wherein updating the vocabulary comprises inserting the text-based target into the vocabulary.

14. The computer program according to claim 12, wherein the input speech signal representative of the command and the proxy is generated by a user of the application speaking the command and the proxy.

15. An application system having speech recognition capabilities that is capable of dynamic vocabulary addition using verbal proxies, comprising:
- a speech recognition interface of an application having a vocabulary that contains one or more defined proxies and capable of processing an input speech signal to generate a text version of a recognized speech representative of words of the input speech signal that are contained within the vocabulary;
- a parsing function of the application that receives the text version of the recognized speech from the speech recognition interface;
- a proxy function of the application that is controlled by the parsing function and that receives a target information from a source external to the application, wherein the target information contains a text-based target of a proxy to be added to the vocabulary of the speech recognition interface;
- a vocabulary update function of the speech recognition interface that is controlled by the proxy function; and
- wherein in response to receiving the input speech signal representative of a command and a proxy contained within the vocabulary, the text version of the recognized speech generated by the speech recognition interface causes the parsing function to provide the text version of the recognized speech to the proxy function, the proxy function links the text-based target of the target information to the proxy, and an update instruction generated by the proxy function controls the speech recognition interface to update the vocabulary to include the text-based target.

16. The application system according to claim 15, wherein the input speech signal representative of the command and the proxy is generated by a user of the application system speaking the command and the proxy.

* * * * *